United States Patent [19]

Hemmis et al.

[11] Patent Number: 5,765,905
[45] Date of Patent: Jun. 16, 1998

[54] WIND-DEFLECTING COVER FOR A CONVERTIBLE

[75] Inventors: Ludger Hemmis, Osnabrueck; Udo Heselhaus, Ibbenbueren, both of Germany

[73] Assignees: Wilhelm Karmann GmbH, Osnabrueck; Bayerische Motoren Werke Aktiengesellschaft, Muenchen, both of Germany

[21] Appl. No.: 575,456

[22] Filed: Dec. 20, 1995

[30] Foreign Application Priority Data

Dec. 24, 1994 [DE] Germany ............... 44 46 769.9

[51] Int. Cl.⁶ ................... B60J 1/00; B60J 7/00
[52] U.S. Cl. ..................... 296/180.1; 296/136
[58] Field of Search ............... 296/180.1, 85, 296/136, 100

[56] References Cited

U.S. PATENT DOCUMENTS 2,959,447  11/1960  Stebbins et al. .......... 296/136 X
2,992,042   7/1961  Gilson et al. ............. 296/136
5,201,565   4/1993  Berardino ................ 296/136

FOREIGN PATENT DOCUMENTS 0487860  6/1992  European Pat. Off.
4018862  1/1992  Germany ............... 296/180.1
4311240  4/1994  Germany ............... 296/180.1

*Primary Examiner*—Joseph D. Pape
*Attorney, Agent, or Firm*—Jordan and Hamburg

[57] ABSTRACT

A wind-deflecting covering for a convertible shields the rear region behind the front seats against drafts in the in-use position and, in the not-in-use position, can be brought into a position freeing the rear region. The covering can be transferred along two lateral, curved guideways from the essentially horizontal in-use position into a not-in-use position, located in the rear region behind the front seat and deposited there in a packed position.

17 Claims, 8 Drawing Sheets

WIND-DEFLECTING COVER FOR A CONVERTIBLE

BACKGROUND OF THE INVENTION

The invention relates to a wind-deflecting cover for a convertible.

For known convertibles with a wind-deflecting cover (EP 0 487 860 A1), a window shade, which can be accommodated on a take-up reel when not in use, as well as a cover with frame, which can be fixed by means of locking elements in a covering position over the rear region of the vehicle, are provided as wind protection. Such wind-deflecting coverings are cumbersome to install as well as to handle.

SUMMARY OF THE INVENTION

It is an object of the invention to provide a wind-deflecting covering for a convertible, which can be adapted with little technical effort to different installation requirements and, while improving operating comfort, enables the rear region as a whole to be closed off adequately securely.

With the covering, which can be moved either manually or automatically, the wind-deflecting covering for a convertible, which is constructed pursuant to the invention, has a component which, on the one hand, can be transferred with little operator effort into a covering position forming an optically attractive closing contour of the whole rear region and, on the other, after it is returned into the interior of the vehicle, can be fixed, for example, in the region in front of, behind or next to the rear seats. In an advantageous development, the covering can be provided with a roof membrane, which can be stowed in a small volume, so that the covering can be put away with little effort in a space-saving manner. It is also conceivable to construct the covering from rod and/or plate parts, which are connected to one another, can be fixed in a space-saving packed position or can guide the covering or the roof parts over extended guideways into the interior of the vehicle in such a manner, that a positioning in the free spaces of the floor and/or the side walls of the body can be attained.

In an advantageous embodiment, the covering is provided with an automatic driving device, the connecting links of which are fixed to the covering in such a manner, that the latter can be moved by means of an electrical operating device, for example, in the front region of the vehicle, either into the closed position or into the open position. In a preferred construction, the covering is movably supported at the edges in guide elements forming the guideways, with which the covering is guided directly in front of the bench seat region of the rear seats and can be fixed in a space-saving packed position here, so that adequate leg room particularly for the user of the rear seats is provided in the rear region. It is also conceivable to lower the covering over a different contour of the guiding parts into a different rear region, so that it can be fixed securely and largely invisibly from the outside.

With regard to further important advantages and details of the invention, reference is made to the following specification and the drawing, in which an embodiment of an inventive, deflecting covering is illustrated.

DESCRIPTION OF THE PREFERRED EMBODIMENTS

Figure 1:
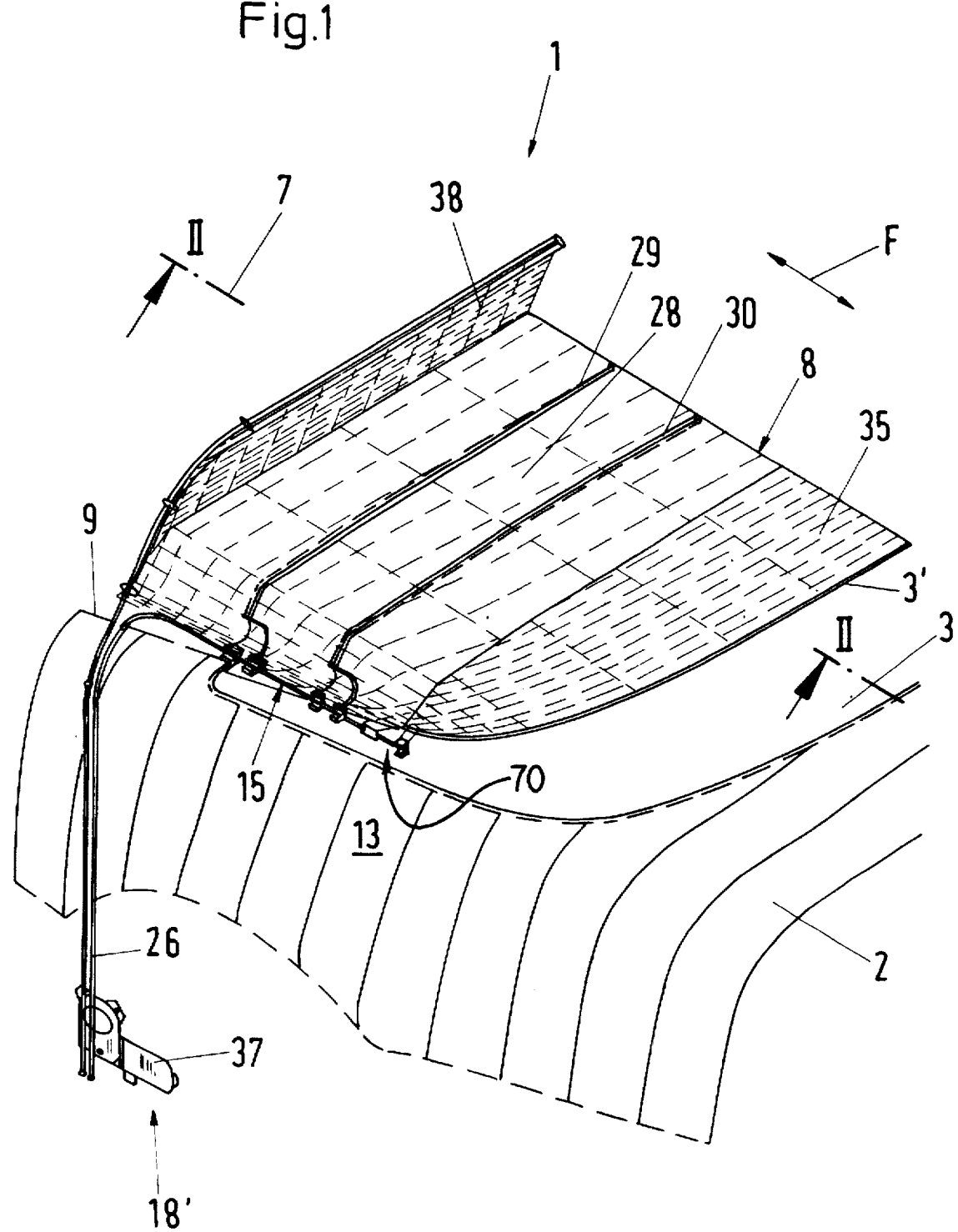
FIG. 1 shows a perspective representation of a rear region of a convertible with a covering in the closed position.

FIG. 1 illustrates wind protection equipment, which is labeled 1 as a whole for a convertible, only the rear contour 2 of which is shown. The wind protection equipment 1 is in a closed position, which largely conforms to a common edge region 3' of a hinged cover 3 covering a convertible folding top (not shown).

The wind protection equipment 1 is provided with a covering 8, which shields the rear region 4 (FIG. 2) behind the respective front seats 5 and, when in a not-in-use position, can be transferred into the interior 6 of the vehicle. The covering 8 is transferred into a closed position over the rear seats 10 (FIGS. 1 and 3). The closed position is essentially horizontal and defines a covering plane in the region of the parapet line 9 of the convertible. For a smooth-running, material saving movement, the covering 8 has in the region of its two longitudinal edges 11, 12 a guideway 15, 16 at the lateral body regions 13, 14. The guideway 15, 16 extends from the region of the parapet line 9 as far as the lower region of the interior 6 or the rear region 4 of the vehicle, following the contour.

Figure 2:
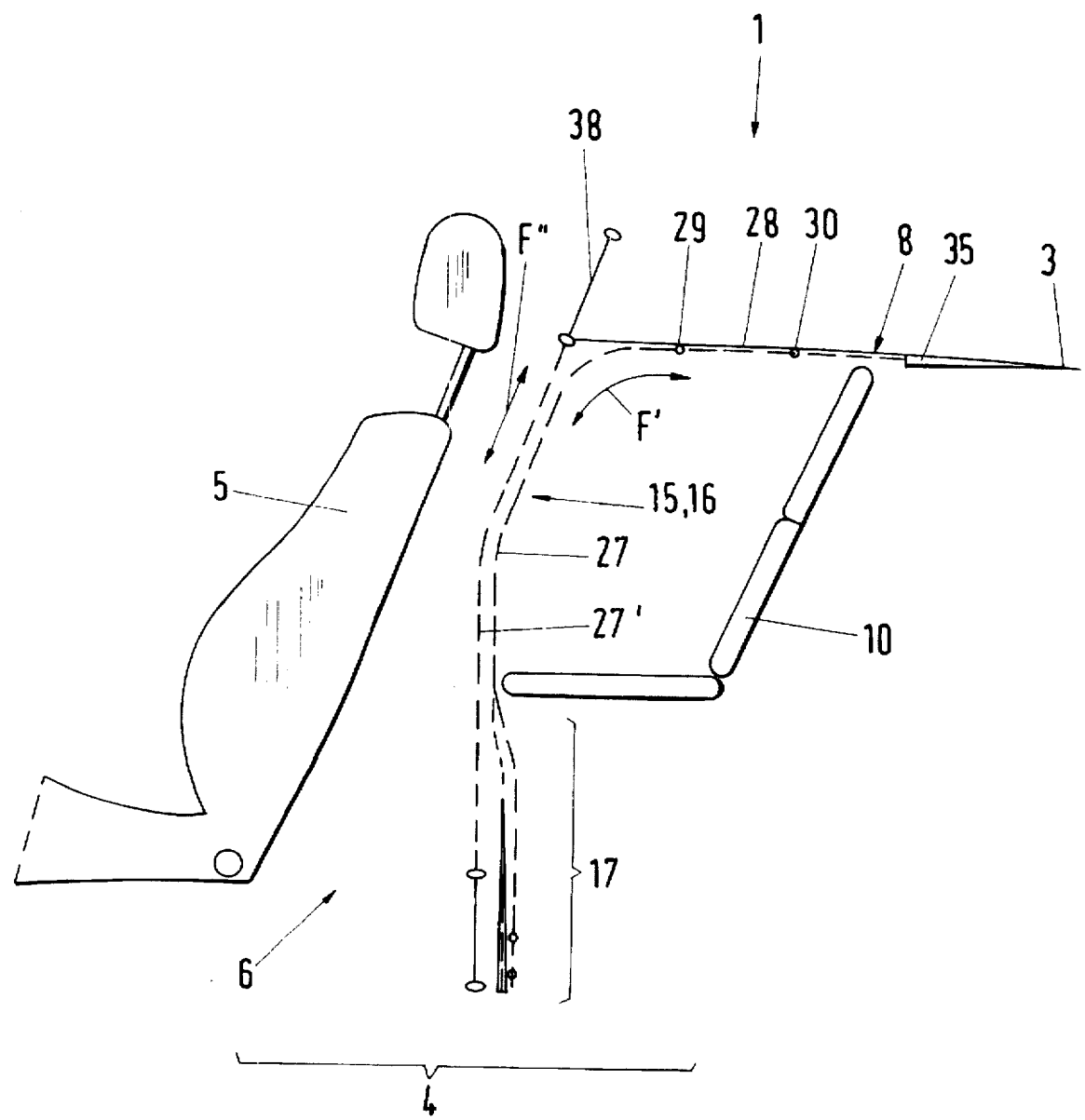
FIG. 2 shows a side view, illustrating the principle of the covering, along a line II—II of FIG. 1.
Figure 3:
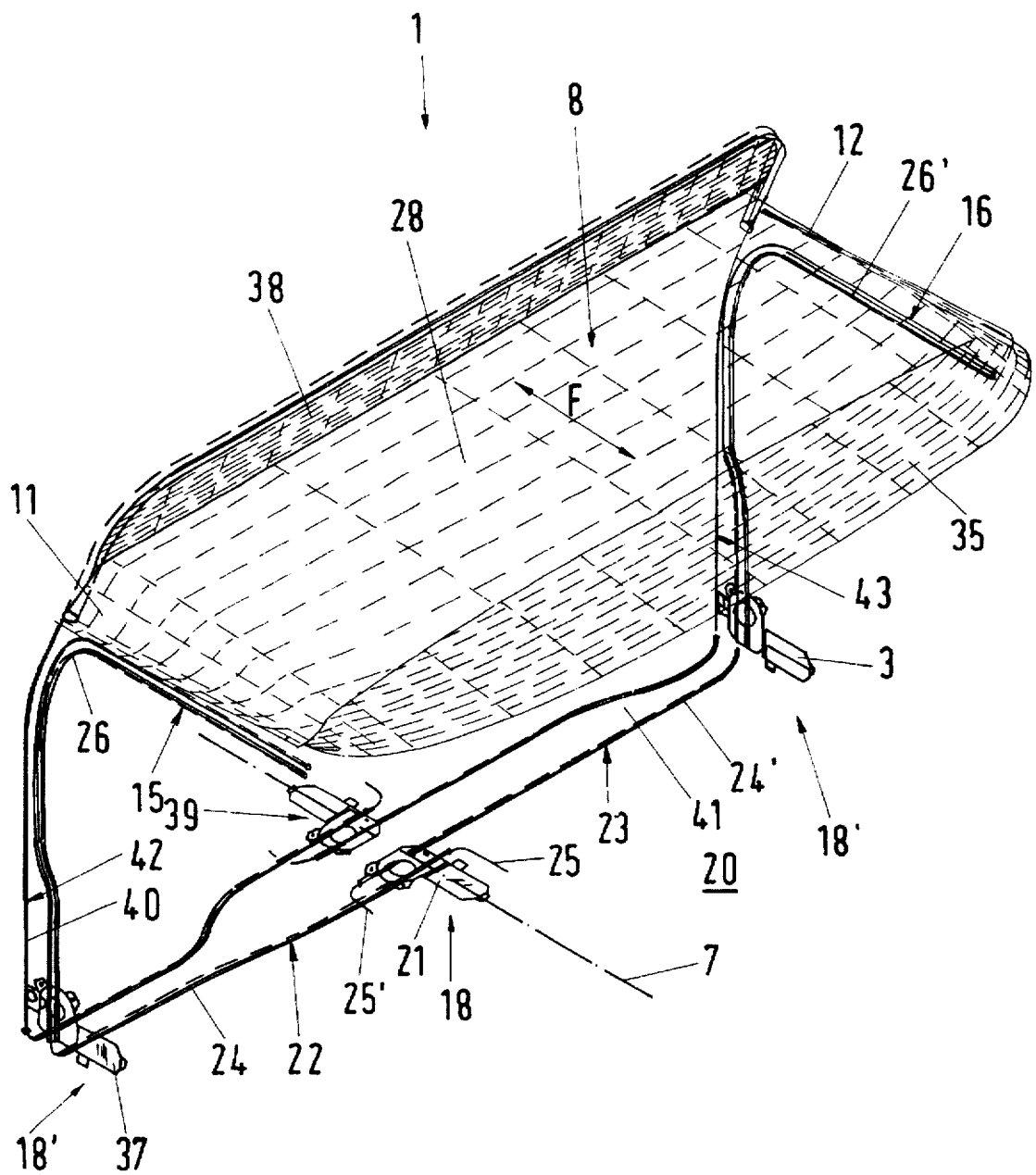
FIG. 3 shows a detailed representation of the covering of FIG. 1 in the closed position.

The covering 8 can be shifted over these guideways 15, 16 under the action of a slight tension or pressure in a first movement phase in the direction of the longitudinal axis 7 of the vehicle (arrow F, FIG. 1) and then, following the guideway, swiveled toward a downward direction (arrow F', FIG. 2), and then moved generally downwardly (arrow F", FIG. 2). At the same time, the covering 8 can be moved in such a manner out of the closed position shown (FIGS. 1 and 3) with simultaneous stabilization in the region of the guideways 15, 16, that the covering 8 can be put away in a stowage area 17 (FIG. 2) in a packed position in a first lowered position located transversely to the longitudinal axis 7 of the vehicle in front of the rear seats in the end regions of the guideways near the floor of the vehicle. It is likewise conceivable that the covering 8 is constructed so that the contour of the respective guideways enables the covering 8 to be moved into a second lowered position (not shown), which is located behind the rear seats 10 or that the covering 8 is taken out of the closed position (FIG. 1, FIG. 3) to the lateral regions 13, 14 of the body and brought into a packed position here.

The above-described opening and closing motions of the covering 8 can be carried out manually in the region of the guideways 15, 16 by means of the components which, as a whole, interact smoothly with one another. In an appropriate embodiment, however, the covering 8 is connected with at least one automatic driving device 18, so that a convenient operation is possible over a switching unit (not shown), which is disposed, for example, in the region of the dashboard or the center console of the convertible.

In a first embodiment of FIG. 3, a driving device 18 is formed by a servomotor 21, which is supported on the floor 20 of the vehicle centrally in the region of the longitudinal axis 7 of the vehicle and engages the covering 8 in each case at the longitudinal edge over two connecting means 22, 23.

In an appropriate embodiment, the connecting means 22, 23 includes two spindle springs 25, 25', which can be moved in opposite directions by means of the servomotor 21 and are guided in encasing tubes 24, 24' and each of which is connected with the covering 8 over the guideways 15, 16 constructed as an accommodating tube 26, 26' in such a way that a uniform force can be applied to the covering 8 in a space-saving manner with little loss due to friction and these are also guided reliably when the opening and closing processes are repeated frequently.

Figure 5:
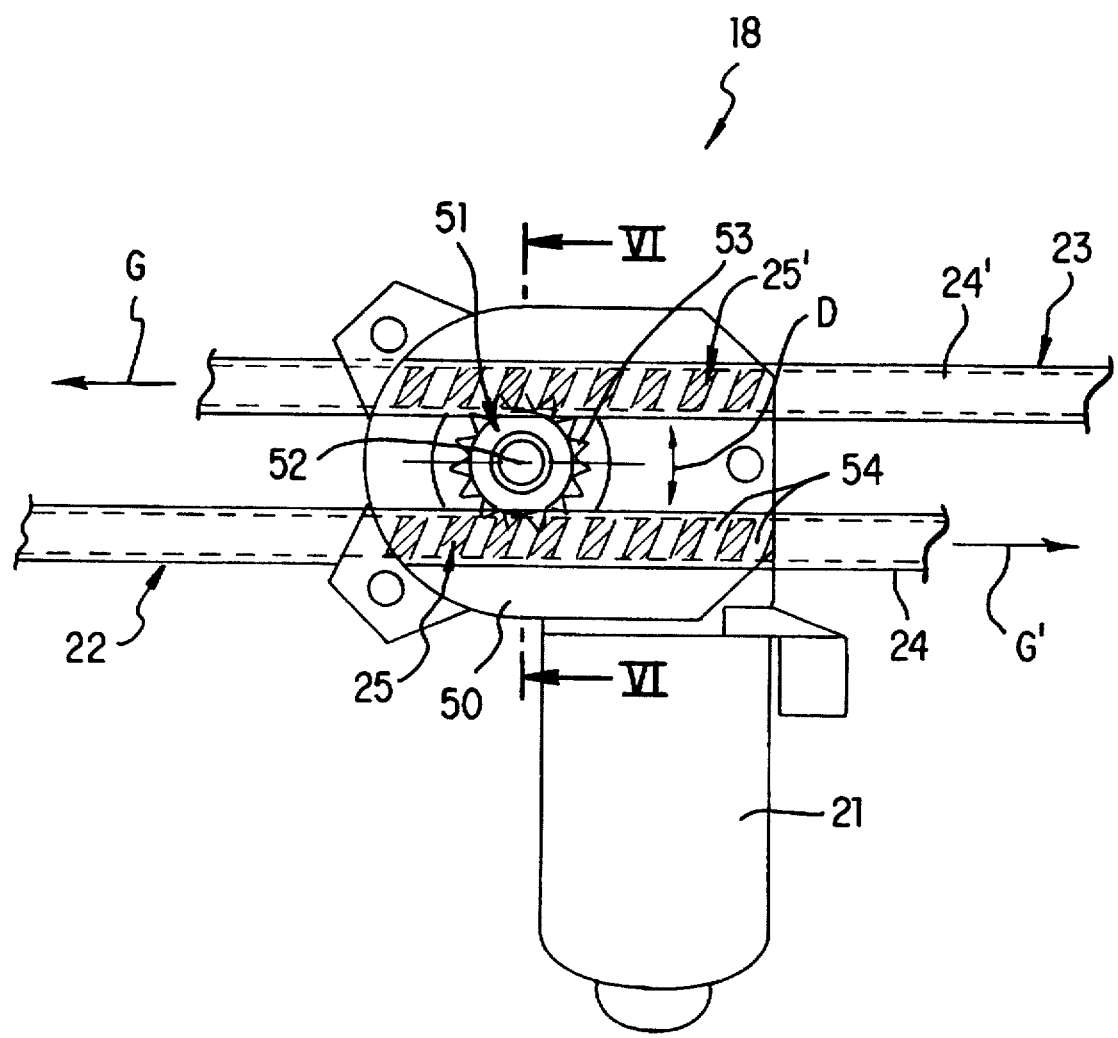
FIG. 5 shows a partially sectional detailed representation of a driving device (of FIG. 1) with connecting elements running to the covering.

In FIG. 5, the driving device 18 is shown in an enlarged, detailed representation and has the servomotor 21 (FIG. 3), which is supported at the body, with a transmission part 50 on the output side and a pinion drive 51. This pinion drive 51 is driven in the region of its axis of rotation 52 (corresponding to the intended direction of rotation—arrow D) and, at the same time, engages with a toothed profiling 53 the periphery of a helical passage (cross-hatched) of the one internal core wire 55 (FIG. 6) and a spiral spring 25, 25' encompassing the core wire 55 and having a spring wire spiral coil 54. With that, driving connections are attained between the spindle springs 25 and 25' and the toothed profiling 53. These driving connections act as if they were an "elastic rack and pinion gear" and make it possible to convert the rotary motion of the pinion drive 51 into a push and pull motion, which can be transferred over the respective connecting elements 22, 23 to the covering 8.

In the region of the driving device 18, the spindle springs 25, 25' are aligned in parallel and tangentially engage the pinion drive 51 in such a manner that the opposite push-pull movement of the spindle springs 25, 25' (arrows G and G'), produced when the rotational movement (arrow D) is introduced, can be transferred to the two side regions (guideway 15, FIG. 1) of the covering 8 and the latter can be moved in the direction of the longitudinal axis 7 of the vehicle (arrow F) (FIG. 1). In the most appropriate embodiment, the spindle springs 25, 25' are accommodated in the respective encasing tubes 24, 24' in such a manner that direct contact between the spindle springs 25, 25' and other parts of the vehicle is avoided.

Figure 6:
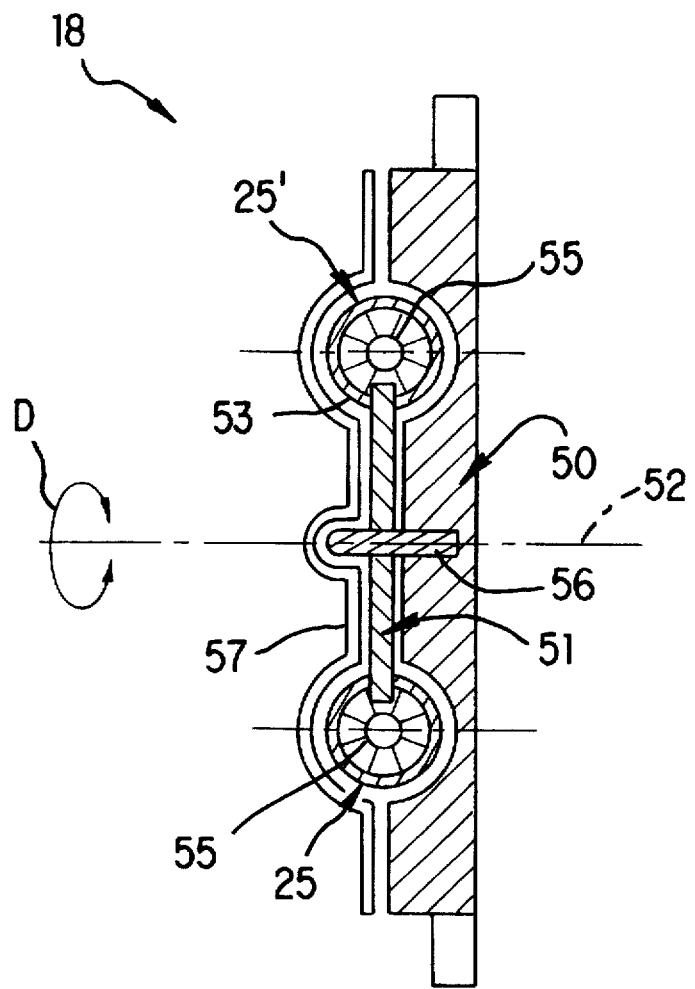
FIG. 6 shows a sectional representation of a driving device along a line VI—VI of FIG. 5.

Furthermore, in the sectional representation of FIG. 6, a drive shaft 56 is shown, which is supported in the region of the transmission part 50 and, together with the pinion drive 51, is covered by a profiled covering part 57, which is not shown in FIG. 5.

The diagrammatic representation of FIG. 2 illustrates with a first line 27 of dots and dashes an appropriate conformation of the movement curve of the covering 8. Under the action of the tensile motion of the servomotor 21 over the spindle springs 25 and the accommodating tube 26, 26', the covering 8 is moved into the region below the rear seats 10. Due to the arched regions of the movement curve, in which there are no sharp-angled changes in direction, the covering 8 does not experience any deformations, which would overload the material or the individual parts of the covering 8.

In a preferred embodiment, the covering 8, shown in FIGS. 1 and 3, is constructed at least regionally as a foldable roof body 28 preferably having a tarpaulin top with two hoops 29, 30 for the top. Likewise, it is conceivable to form the roof body 28 from individual folding bodies or similar panel parts (not shown), which are connected with one another. Admittedly, these increase the cost of manufacturing the covering 8. At the same time, however, an improved, theft-proof closure of the rear region 4 is achieved in the closed position and, with that, additional luggage space is formed.

Figure 4:
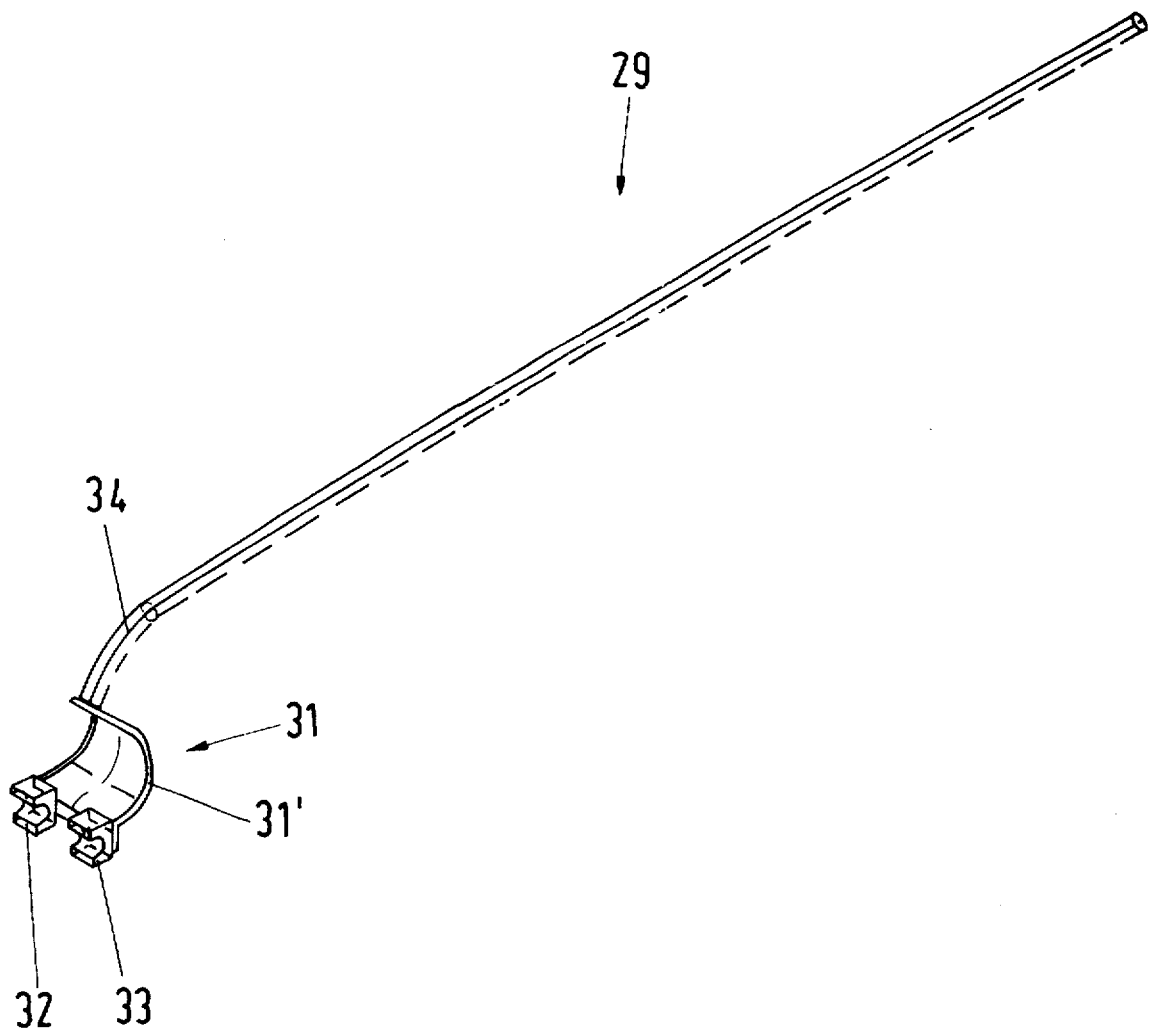
FIG. 4 shows an enlarged detailed representation of a hoop with a connecting plate at the edge.

The roof body 28 is stretched at the edge towards the region of the guideways 15, 16 over the hoops 29, 30 of the top and the latter, in turn, have a driving plate 31 (FIG. 4) at the edge. Towards the region of the guideways 15 and 16, there are at the edge of the driving plate 31 two sliding cams 32, 33 which, on the one hand, are guided in or at the guideways 15, 16 and, at the same time, make it possible to connect the driving plate 31 and the respective spindle springs 25, 25'. For an optically pleasing profiling effect of the hoops 29, 30 for the top below the roofing 28, the hoops 29, 30 for the top are each provided with an arched end region 34, which is resting on a driving plate 31 having a convexly profiled shape 31'.

Figure 7:
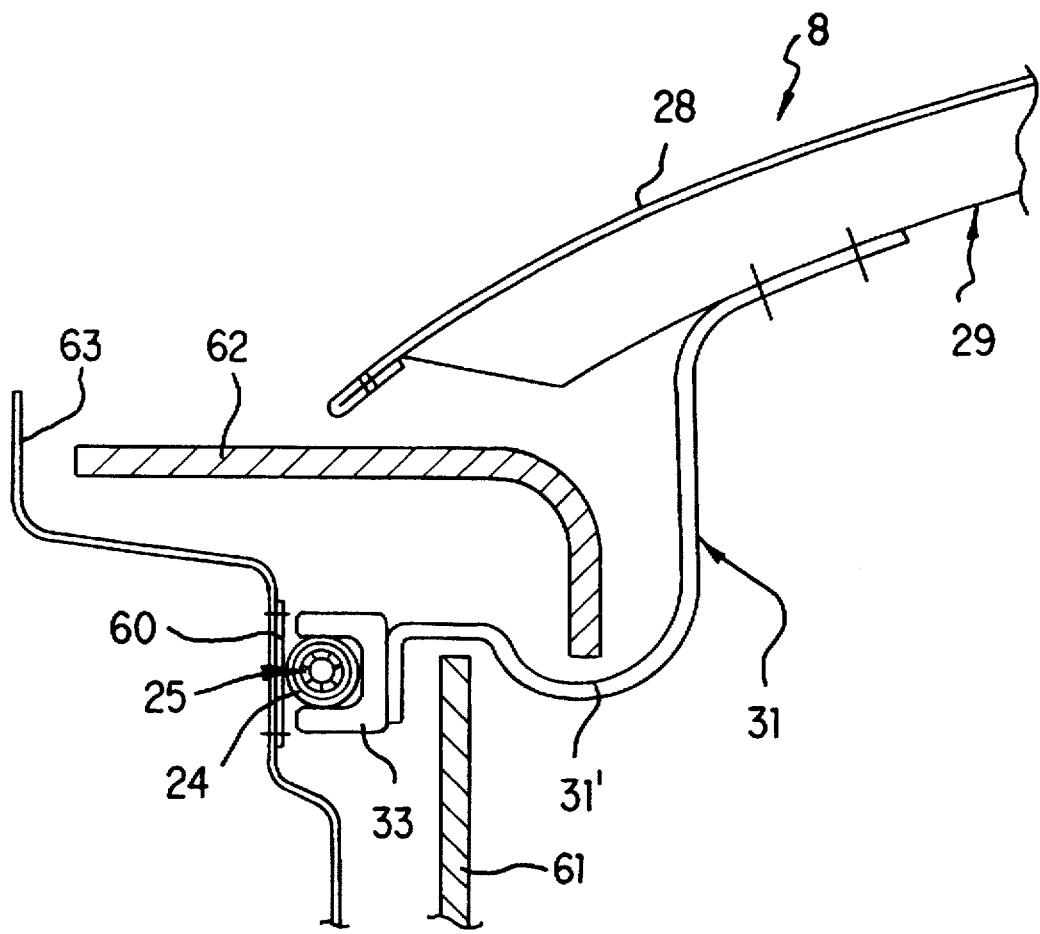
FIG. 7 shows an enlarged sectional representation of the covering in the region connecting the spindle spring to the hoop of the cover.

In FIG. 7, the tying of the spindle spring 25 to the covering 8 in the region of the cover hoop 29 having the driving plate 31, required for the above-described movement of the components, is shown. In this region, the encasing tube 24, defining the guideway 15, is supported on the body side by way of a fixed supporting part 60. The sliding cams 32, 33 (FIG. 4) of the respective covering hoop 29 lie at the outer periphery of the encasing tube 24 in such a manner, that the covering hoops 29, 30 (FIG. 1) are supported so that they can slide. When the servomotor 21 is actuated, a track-guided motion (arrow F, FIG. 1) along the encasing tube 24 is imparted to these cover hoops 29, 30.

In the region of the convex profiled shape 31', the driving plate 31 of the hoop 29 of the cover has an undercut profiling, so that this connection and motion region of the covering 8 is covered by the inner lining 61, the railing 62 and the sheet metal 63 of the body and, with that, protected against access.

In a further, appropriate embodiment, the covering 8 is provided at least in the region of the roof body 28, which is the front region in the swinging-out direction, with a reinforcing plate 35, which in the closed position forms a transition of identical contour into the upper shape 3' of the body. At the same time, the folded roofing 28 can be fixed in the interior of the convertible with said reinforcing plate 35 in a protective covering position in the opening or packed position.

Figure 8:
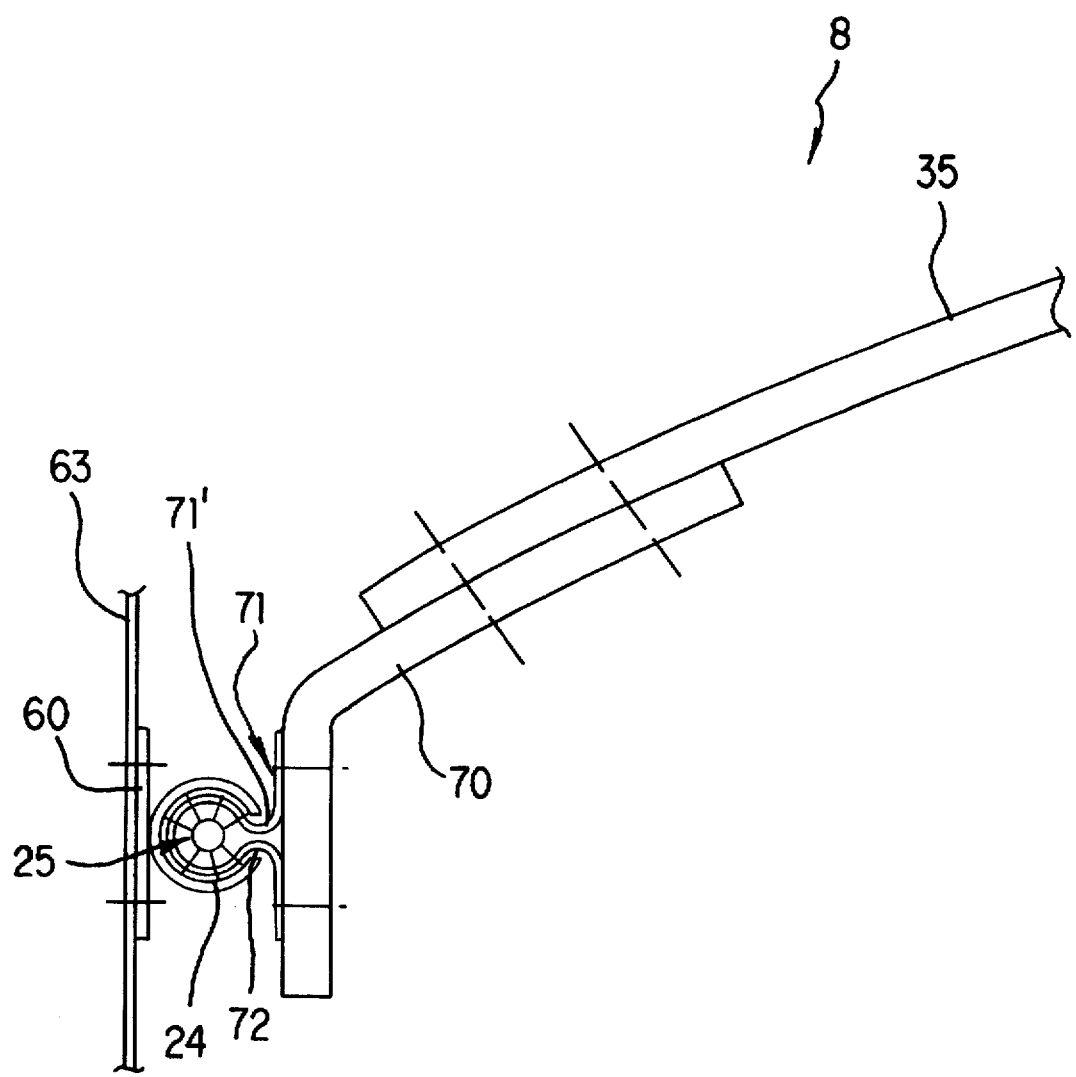
FIG. 8 shows a sectional representation, similar to that of FIG. 7, in the region connecting the spindle to a reinforcing plate at the end of the covering.

In FIG. 8, the tying of the end of the spindle spring 25 to the reinforcing plate 35 of the covering 8 is shown. The edge of the reinforcing plate 35 has an angular holding body 70, to which, on the other hand, a catch 71, which is directed towards the spindle spring 25, is fixed. This catch 71, in turn, engages with an arched profile 71 at, the encasing tube 24 in the region of the longitudinal slot 72 and is firmly connected with the end region of the spindle spring 25 in such a manner that, when the rotational movement is introduced in the region of the pinion drive 51, either tensile forces (which act in the driving direction when the covering 8 is being opened) or thrusting forces (which act when the covering 8 is moving contrary to the driving direction until it reaches the closed position of FIG. 1) are transferred simultaneously over the two spindle springs 25 and 25' and over the catches 71, disposed on either side of the covering 8, to the reinforcing plate 35 and, with that, the roof body 28 and the hoops 29, 30 for the cover are shifted jointly with the reinforcing plate 35 into the respective open or closed position.

For an interlocking connection between the edge region of the body 2 and the covering 8, the edge of the latter can be provided with one or more locking elements (not shown), which automatically engage in the closed position and are provided with automatic unlocking.

In addition to the driving device 18, an alternative embodiment is shown in the representation of FIG. 3. Instead of the central servomotor 21 (or in addition to this), servomotors 36, 37, which rest on the body, are provided at each side at the end regions of the guideways 15, 16. In the representation of FIG. 1, only one of the servomotors 37 is shown.

In an extension of the above-described embodiments of the wind-protection apparatus 1, the latter can be connected with a known wind partition 38. This embodiment, shown in FIGS. 1 and 3, has a separate servomotor 39 (FIG. 3), which is connected over corresponding spindle springs 40, 41 along vertical guiding elements 42, 43 with the wind partition 38, so that the latter can be moved automatically to the in-use or the not-in-use position along a vertical path 27' of motion (FIG. 2).

The above-described servomotors 18, 36, 37, 39 result in different operating and equipping variations, in order to move, on the one hand, the covering 8 and, on the other, to move the wind partition 38 as required. Moreover, a combined movement of the covering 8 and of the wind partition 38 over a single or over several servomotors is as conceivable as a control of the motors in such a manner, that the two wind coverings 8 and 38 are transferred simultaneously or consecutively by the operator in to the optimum wind protection position and/or closing position.

What we claim is:

1. A covering for a convertible having a rear seat and a rear seat area comprising guide means mounted on said convertible in said rear seat area, said guide means include an arcuate intermediate portion joined to a generally horizontal portion and to a generally vertical portion, a cover, movable means on said cover movably mounting said cover on said guide means for movement between an in-use position and a not-in-use position, said cover when in said in-use position being in a substantially unfolded disposition and extending substantially horizontally over said rear seat area, said cover when in said not-in-use position being disposed in a folded disposition juxtaposed to said rear seat.

2. A covering for a convertible having a rear seat and a rear seat area and in which the rear seat has a seat part and a back rest, comprising guide means mounted on said convertible in said rear seat area, a cover, movable means on said cover movably mounting said cover on said guide means for movement between an in-use position and a not-in-use position, said cover when in said in-use position being in a substantially unfolded disposition and extending substantially horizontally over said rear seat area, said cover when in said not-in-use position being disposed in a folded disposition juxtaposed to said rear seat, said cover when in said not-in-use position being juxtaposed to said seat part.

3. A covering according to claim 2 wherein said seat part has a front side, said cover when in said not-in-use position being juxtaposed to said front side of said seat part.

4. A covering according to claim 2 wherein said back rest has a top end, said cover when in said in-use position extending over said top end of said back rest.

5. A covering for a convertible having a rear seat and a rear seat area and in which the rear seat area has a floor, comprising guide means mounted on said convertible in said rear seat area, a cover, movable means on said cover movably mounting said cover on said guide means for movement between an in-use position and a not-in-use position, said cover when in said in-use position being in a substantially unfolded disposition and extending substantially horizontally over said rear seat area, said cover when in said not-in-use position being disposed in a folded disposition juxtaposed to said rear seat, said cover when in said not-in-use position being juxtaposed to said floor.

6. A covering for a convertible having a rear seat and a rear seat area and in which said rear seat has a front side, comprising guide means mounted on said convertible in said rear seat area, a cover, movable means on said cover movably mounting said cover on said guide means for movement between an in-use position and a not-in-use position, said cover when in said in-use position being in a substantially unfolded disposition and extending substantially horizontally over said rear seat area, said cover when in said not-in-use position being disposed in a folded disposition juxtaposed to said rear seat, said cover when in said not-in-use position being disposed in front of said front side of said rear seat, said cover when in said not-in-use position having a generally elongate axis, said cover when in said not-in-use position having its elongate axis extending generally transversely of the longitudinal axis of said convertible.

7. A covering for a convertible having a rear seat and a rear seat area comprising guide means mounted on said convertible in said rear seat area, a cover, movable means on said cover movably mounting said cover on said guide means for movement between an in-use position and a not-in-use position, said cover when in said in-use position being in a substantially unfolded disposition and extending substantially horizontally over said rear seat area, said cover when in said not-in-use position being disposed in a folded disposition juxtaposed to said rear seat, said cover having a generally elongate axis, said cover when in said not-in-use position having its elongate axis disposed generally transversely to the longitudinal axis of said convertible.

8. A covering for a convertible having a rear seat and a rear seat area comprising guide means mounted on said convertible in said rear seat area, a cover, movable means on said cover movably mounting said cover on said guide means for movement between an in-use position and a not-in-use position, said cover when in said in-use position being in a substantially unfolded disposition and extending substantially horizontally over said rear seat area, said cover when in said not-in-use position being disposed in a folded disposition juxtaposed to said rear seat, drive means for moving said cover between said in-use and said not-in-use position, said drive means including a drive motor, said drive means further comprising connecting means operably connecting said drive motor with said cover, said connecting means comprising tube elements and spindle means disposed in said tube elements, said spindle means being connected to edges of said cover, said connecting means comprising two tube elements and two spindle means moveable in opposite directions in said two respective tube elements by said drive motor.

9. A covering according to claim 8 wherein said tube elements have substantially the same configuration as said guide means.

10. A covering according to claim 9 wherein said cover comprises a foldable roof body and cover support elements which support said foldable roof body when said cover is in said in-use position.

11. A covering according to claim 10 wherein said cover support elements include hoop means supporting said foldable roof body when said cover is in said in-use position, said hoop means having an end position provided with a driving plate which engages said tube elements.

12. A covering according to claim 11 wherein said driving plate has sliding cam means, said sliding cam means being slidable on said guide means.

13. A covering according to claim 11 wherein said driving plate has an arcuate configuration having an inner face facing the inside of said rear seat area of said convertible, said inner face having a convex configuration, said hoop means having an adjacent section adjacent to said driving plate, said adjacent section being joined to said driving plate, said adjacent section having an arcuate configuration.

14. A covering for a convertible having a rear seat and a rear seat area comprising guide means mounted on said convertible in said rear seat area, a cover, movable means on said cover movably mounting said cover on said guide means for movement between an in-use position and a not-in-use position, said cover when in said in-use position being in a substantially unfolded disposition and extending substantially horizontally over said rear seat area, said cover when in said not-in-use position being disposed in a folded disposition juxtaposed to said rear seat, said cover having a front portion, said cover further including a wind partition means at said front portion of said cover and moveable between an up position and a down position, and drive means on said convertible for moving said wind partition between said up position and said down position.

15. A covering according to claim 14 wherein said drive means is designated a first drive means, second drive means operable to move said wind partition means between said up position and said down position, and interactive means providing an interactive relationship between said first and second drive means.

16. A covering according to claim 15 wherein said first and second drive means are operable to move said wind partition means between said up position and said down position simultaneously while moving said cover between said in-use position and said not-in-use position.

17. A covering according to claim 15 wherein said first and second drive means are operable to move said wind partition means between said up position and down position consecutively while moving said cover between said in-use position and said not-in-use position.

\* \* \* \* \*